US008175855B2

(12) United States Patent
Hao

(10) Patent No.: US 8,175,855 B2
(45) Date of Patent: May 8, 2012

(54) PREDICTIVE SYSTEM AND METHOD FOR THE DESIGN OF MECHANICAL RESONANT DEVICES

(75) Inventor: Zhili Hao, Virginia Beach, VA (US)

(73) Assignee: Old Dominion University Research Foundation, Norfolk, VA (US)

( * ) Notice: Subject to any disclaimer, the term of this patent is extended or adjusted under 35 U.S.C. 154(b) by 652 days.

(21) Appl. No.: 12/221,857

(22) Filed: Aug. 7, 2008

(65) Prior Publication Data
US 2009/0083011 A1    Mar. 26, 2009

Related U.S. Application Data

(60) Provisional application No. 60/963,800, filed on Aug. 7, 2007, provisional application No. 60/965,423, filed on Aug. 20, 2007.

(51) Int. Cl.
G06F 17/10    (2006.01)
(52) U.S. Cl. .................................. 703/2; 703/6; 703/13
(58) Field of Classification Search .................. 703/1, 2, 703/6, 13
See application file for complete search history.

(56) References Cited

U.S. PATENT DOCUMENTS
7,006,960 B2 *    2/2006    Schaumont et al. ............ 703/15

OTHER PUBLICATIONS

Younis, "Modeling and Simulation of Microelectromechanical System in Multi-Physics Fields", PhD Dissertation, Jun. 2004, pp. 1-138.*
Zhang et al., "Thermoelastic Damping in the Longitudinal Vibration: Analysis and Simulation", Proceedings of IMECE04, 2004 ASME International Mechanical Engineering Congress and Exposition, Nov. 2004, 5 pages.*
Reference to Hao et al., "Thermoelastic Damping in Flexural-Mode Ring Gyroscopes", Proceedings of IMECE05, 2005 ASME International Mechanical Engineering Congress and Exposition, Nov. 2005, 9 pages.*
Zhang, "Energy Dissipations in MEMS Resonators: Fluid Damping of Flexural Resonators and Thermoelastic Damping", PhD Dissertation, Dec. 2006, pp. 1-127.*
ANSYS; "Technical Overview", including the MULTIPHYSICS™ tool, "© 1996 SAS IP, Inc."; 79 pages.

* cited by examiner

Primary Examiner — Kamini S Shah
Assistant Examiner — Herng-Der Day
(74) Attorney, Agent, or Firm — Williams Mullen

(57)    ABSTRACT

A method and system for predicting the quality factor of a mechanical resonant (MR) device. The system and method simulates uncoupled elastic vibration of the MR device to produce simulated dilatation and collects data relating to the dilatation and maximum stored elastic vibration energy. It determines the internal heat source data of the MR device caused by dilatation based on the thermal expansion effect of the MR device material, conveying the internal heat source data along with transient heat conduction data to a simulation engine, which simulates and determines the temperature variation. Thermoelastic damping over one cycle of vibration is determined, enabling the prediction of the quality factor relating to thermoelastic damping over one cycle of vibration of the MR device, and the maximum elastic vibration energy stored over one cycle of vibration.

8 Claims, 18 Drawing Sheets
(11 of 18 Drawing Sheet(s) Filed in Color)

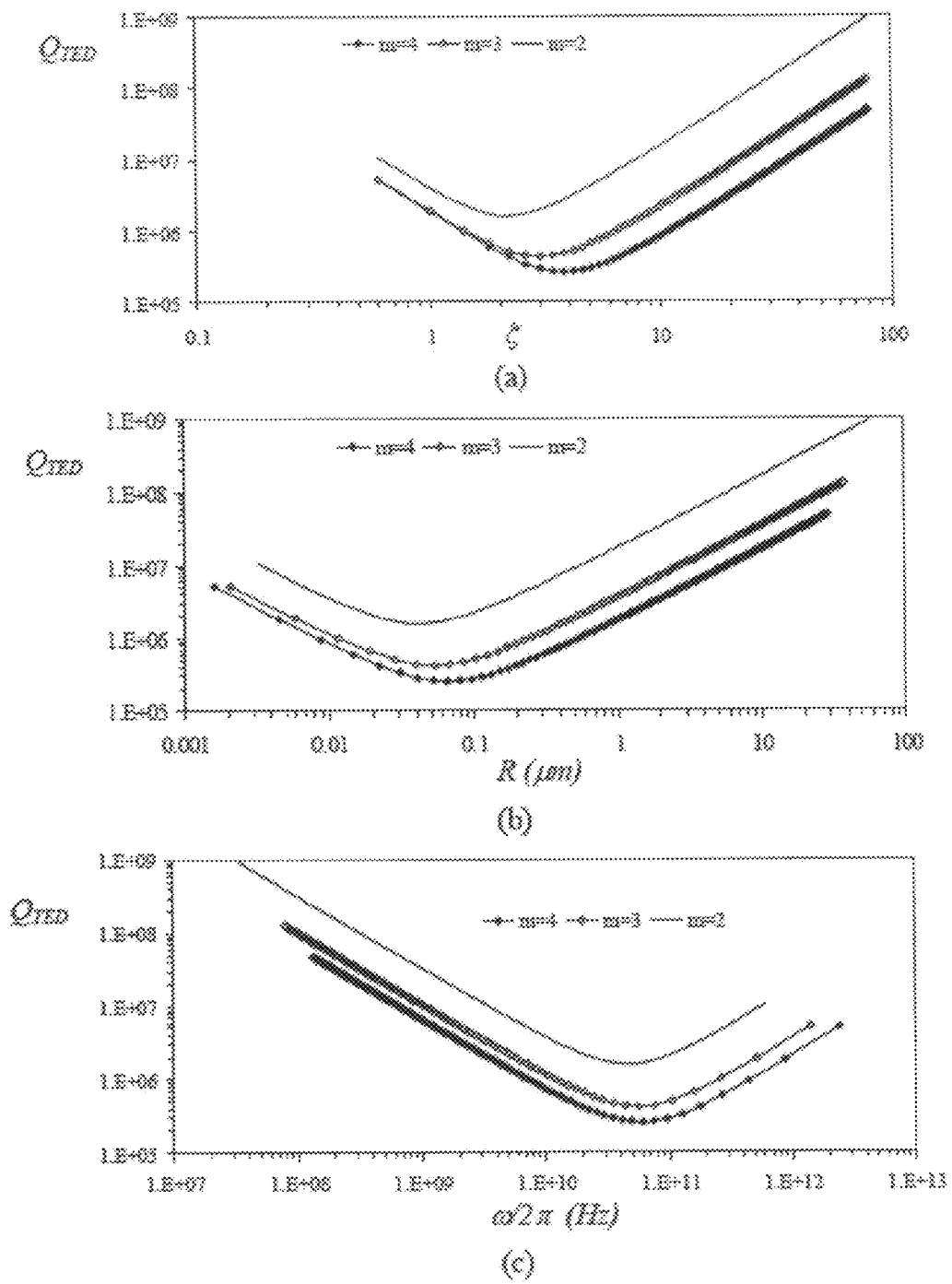
FIG. 3(a) – (c)

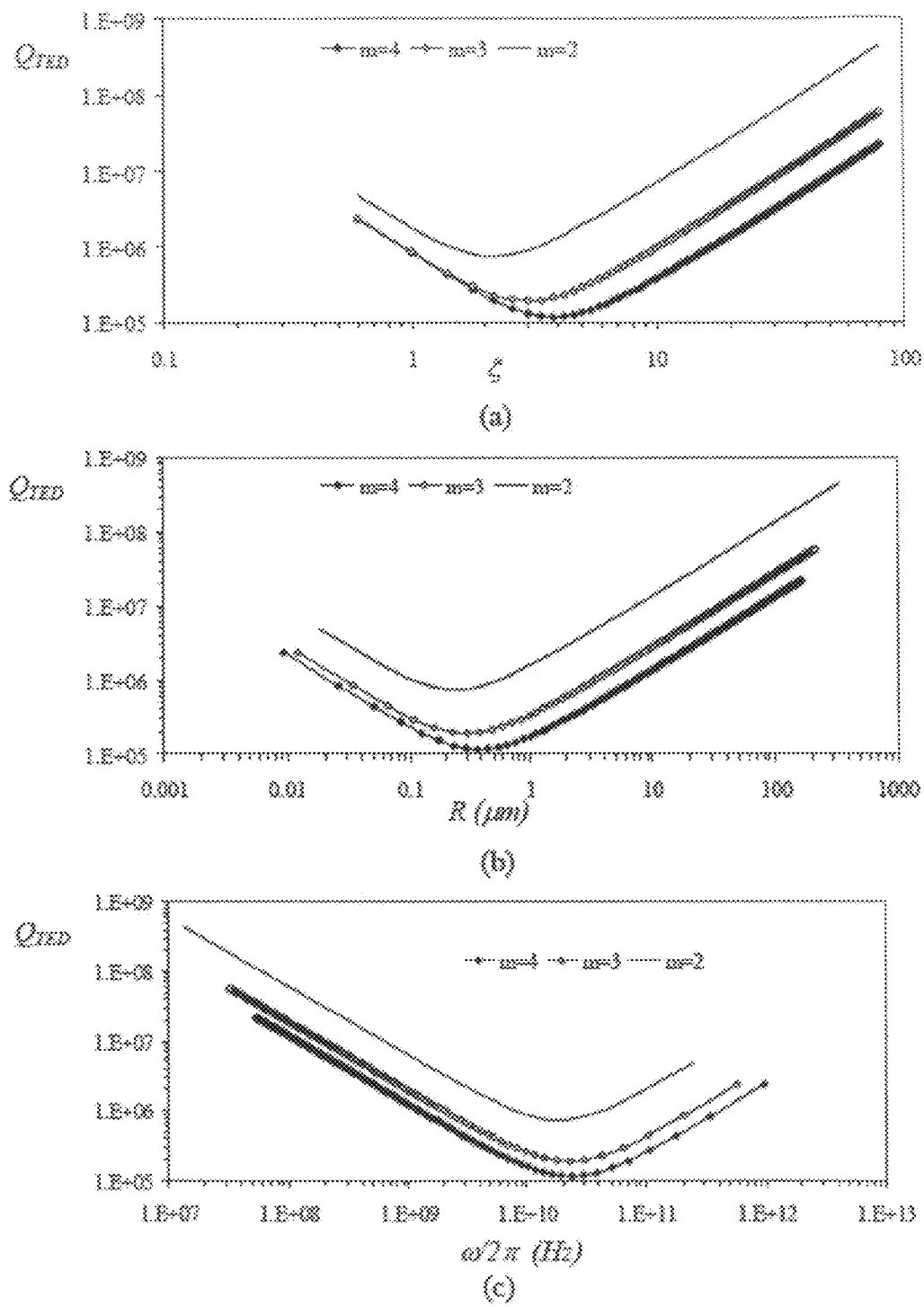
FIG. 4(a)-(c)

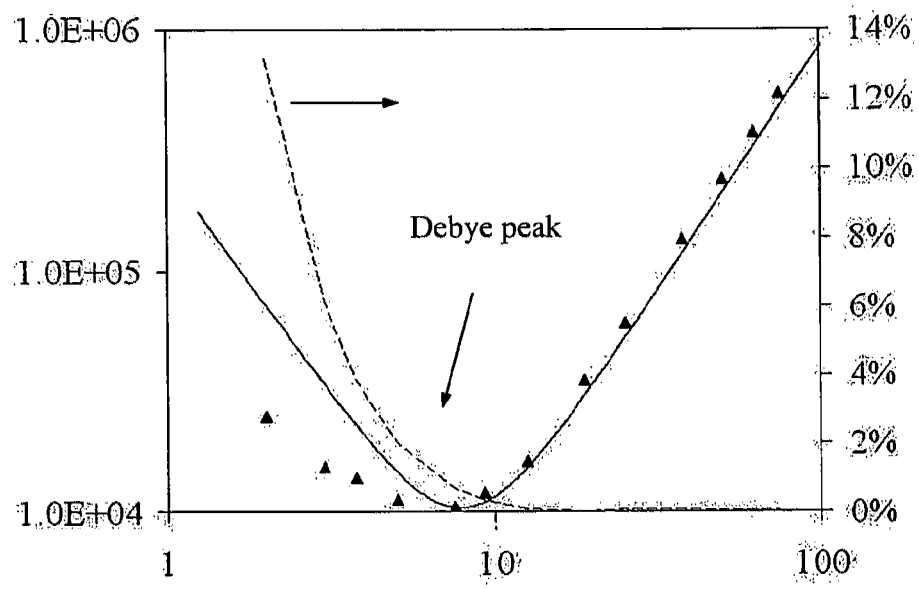
(a)  Length/width ratio
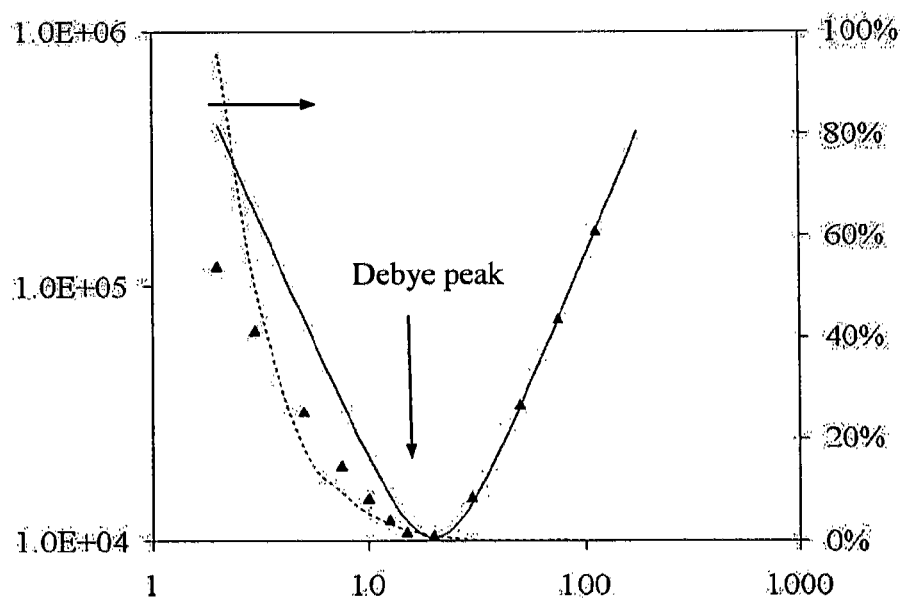
(b)  Length/width ratio
FIG. 5(a)-(b)

PREDICTIVE SYSTEM AND METHOD FOR THE DESIGN OF MECHANICAL RESONANT DEVICES

CROSS-REFERENCE TO RELATED APPLICATION

This application claims the benefit of priority to U.S. application Ser. No. 60/963,800, filed Aug. 7, 2007, titled Predictive System and Method for the Design of Mechanical Resonant Devices, and to U.S. application. Ser. No. 60/965,423, filed Aug. 20, 2007, also titled Predictive System and Method for the Design of Mechanical Resonant Devices, the entire contents of both of which are incorporated herein by reference.

FIELD OF THE INVENTION

The present invention relates to a predictive system and method for the design of mechanical resonant (MR) devices, including in particular, nano- or micro-mechanical resonant devices fabricated from isotropic and/or anisotropic materials.

BACKGROUND OF THE INVENTION

Micro- and nano-mechanical resonant devices (or "MR devices") have found a wide variety of applications, including resonant accelerometers, gyroscopes, energy scavengers, oscillators, electrical filters, infrared sensors, and physical instruments. For all these applications, two figures of merit for the design of these devices are the resonant frequency and the mechanical quality factor ("Q factor" or "Q"). For the purposes herein, reference to "mechanical resonant (MR) device" includes micro- and nano-mechanical resonance devices.

The resonant frequency provides information about the resonance characteristics of the device, while the Q factor is a measurement of energy dissipation of the device during its vibrations. Q may be considered to be a comparison of the frequency of vibration to the rate of energy dissipation, or the stored maximum vibration energy per vibration cycle to the energy dissipation per cycle. There are a variety of energy dissipation mechanisms, such as support loss, surface loss, thermoelastic damping, etc. If Q is high, then the dissipation rate of energy is low, while a lower Q indicates a relatively greater dissipation of energy per vibration cycle.

Thermo-elastic damping imposes the upper limit of the achievable Q in a resonator. The mechanism of thermo-elastic damping is that a change of temperature of a device may cause thermo-elastic deformation, and conversely, a mechanical deformation may cause a change of temperature. As a device vibrates or oscillates, the coupling between heat conduction and strain rate will induce a form of irreversible heat generation, which generation is referred to as "thermo-elastic damping" or TED. Thus, QTED is the quality factor attributable to thermo-elastic damping.

Various engineering software applications or tools are available to assist the design of micro- and nano-mechanical resonant devices. Such tools are relatively comprehensive and assist in simulating a concept, developing a prototype, and testing; these tools may be used for simulation of physical dynamics, thermal issues, electrical, and other domains.

Although the prediction of the resonant frequency may be determined by using such finite element modeling (FEM) software, an effective and easy-to-use tool for prediction of the Q is not available. In most cases, the Q will not be known until experimental measurement is implemented, which is costly and time-consuming. Therefore, a quantitative evaluation or predictive system for determining the Q is of significant importance for developing micro- and nano-mechanical resonators.

SUMMARY OF THE INVENTION

Accordingly, an aspect of the present invention is a system for the design of a mechanical resonant (MR) device. This system is adaptable for use with a computer storage media coupled with a processor, the processor also being coupled with an input device for a user and implemented with an application program executable by the processor. This application program is for simulating uncoupled elastic vibration of the MR device design to produce simulated dilatation of the MR device. The application collects data input by a user relating to dilatation and maximum stored elastic vibration energy of the MR device design. The application determines the internal heat source data of the MR device caused by dilatation based on the thermal expansion effect of the MR device material, wherein said internal heat source data is capable of being submitted, along with transient heat conduction data input by a user, to an engine of the application that is adapted to simulate and determine the temperature variation within the MR device and the thermoelastic damping over one cycle of vibration of the device. With this, the application is capable of determining the quality factor relating to thermoelastic damping as a function of the thermoelastic damping over one cycle of vibration of the device and the maximum elastic vibration energy stored over one cycle of vibration.

If the MR device is made from an anisotropic material, an embodiment of the application program may simulate and determine the temperature variation within the MR device and the thermoelastic damping over one cycle of vibration of the device using the equation $$\Delta Q = \int_0^{t_0} \int_V [\kappa] \nabla \theta \cdot \frac{\nabla \theta}{T_0} \cdot dv \cdot dt$$

where $t_0$ is the time period of the one cycle of vibration, $\kappa$ is the thermal conductivity, $T_0$ is the absolute initial temperature at a point in the MR device, $\theta$ is the temperature variation, and V is the volume of the MR device. Another embodiment of that application program may determine the quality factor relating to thermoelastic damping using the equation $$Q_{TED} = 2\pi \cdot \frac{W}{\Delta Q}$$

where W is the stored maximum elastic vibration energy per cycle of vibration.

If the MR device is made from an isotropic material, an embodiment of the application program may simulate and determine the temperature variation within the MR device and the thermoelastic damping over one cycle of vibration of the device using the equation $$\Delta Q = \int_0^{t_0} \int_V \frac{\kappa (\nabla \theta)^2}{T_0} \cdot dv \cdot dt$$

where $t_0$ is the time period of the one cycle of vibration, $\kappa$ is the thermal conductivity, $T_0$ is the absolute initial temperature at a point in the MR device, $\theta$ is the temperature variation, and V is the volume of the MR device. Another embodiment of that application program may determine the quality factor relating to thermoelastic damping using the equation $$Q_{TED} = 2\pi \cdot \frac{W}{\Delta Q}$$

where W is the stored maximum elastic vibration energy per cycle of vibration.

The present invention includes a method of predicting the quality factor of a design of a mechanical resonance (MR) device. This method involves simulating uncoupled elastic vibration of the MR device to produce simulated dilatation of the MR device; collecting data relating to dilatation and maximum stored elastic vibration energy of the device design; determining the internal heat source data of the device caused by dilatation based on the thermal expansion effect of the MR device material; conveying the internal heat source data along with transient heat conduction data to a simulation engine and simulating and determining the temperature variation within the MR device; determining the thermoelastic damping over one cycle of vibration of the MR device; and determining the quality factor relating to thermoelastic damping as a function of the thermoelastic damping over one cycle of vibration of the MR device and the maximum elastic vibration energy stored over one cycle of vibration.

In the event that the method is applied to an MR device made from an anisotropic material, then the step of simulating and determining the temperature variation within the MR device and the thermoelastic damping over one cycle of vibration of the device may use the equation $$\Delta Q = \int_0^{t_0} \int_V [\kappa] \nabla \theta \cdot \frac{\nabla \theta}{T_0} \cdot dv \cdot dt$$

where $t_0$ is the time period of the one cycle of vibration, $\kappa$ is the thermal conductivity, $T_0$ is the absolute initial temperature at a point in the MR device, $\theta$ is the temperature variation, and V is the volume of the MR device. Such a method may involve a step for determining the quality factor relating to thermoelastic damping using the equation $$Q_{TED} = 2\pi \cdot \frac{W}{\Delta Q}$$

where W is the stored maximum elastic vibration energy per cycle of vibration.

In the event that the method is applied to an MR device made from an isotropic material, then the step of simulating and determining the temperature variation within the MR device and the thermoelastic damping over one cycle of vibration of the device may use the equation $$\Delta Q = \int_0^{t_0} \int_V \frac{\kappa (\nabla \theta)^2}{T_0} \cdot dv \cdot dt$$

where $t_0$ is the time period of the one cycle of vibration, $\kappa$ is the thermal conductivity, $T_0$ is the absolute initial temperature at a point in the MR device, $\theta$ is the temperature variation, and V is the volume of the MR device. Such a method may involve a step for determining the quality factor relating to thermoelastic damping using the equation $$Q_{TED} = 2\pi \cdot \frac{W}{\Delta Q}$$

where W is the stored maximum elastic vibration energy per cycle of vibration.

The present invention may be implemented on a computer readable medium. That is, an aspect of the present invention is a computer readable medium storing a computer program product for predicting the quality factor of a design of a mechanical resonance (MR) device, the computer readable medium having computer program code for simulating uncoupled elastic vibration of the MR device to produce simulated dilatation of the MR device, computer program code for collecting data relating to dilatation and maximum stored elastic vibration energy of the device design, computer program code for determining the internal heat source data of the device caused by dilatation based on the thermal expansion effect of the MR device material; computer program code for conveying the internal heat source data along with transient heat conduction data to a simulation engine and simulating and determining the temperature variation within the MR device; computer program code for determining the thermoelastic damping over one cycle of vibration of the MR device; and computer program code for determining the quality factor relating to thermoelastic damping as a function of the thermoelastic damping over one cycle of vibration of the MR device and the maximum elastic vibration energy stored over one cycle of vibration.

For an MR device that is made from an anisotropic material, the computer program code for simulating and determining the temperature variation within the MR device and the thermoelastic damping over one cycle of vibration of the device may use the equation $$\Delta Q = \int_0^{t_0} \int_V [\kappa](\nabla \theta) \cdot \frac{\nabla \theta}{T_0} \cdot dv \cdot dt$$

where $t_0$ is the time period of the one cycle of vibration, $\kappa$ is the thermal conductivity, $T_0$ is the absolute initial temperature at a point in the MR device, $\theta$ is the temperature variation, and V is the volume of the MR device. In addition, such program code for determining the quality factor relating to thermoelastic damping may use the equation $$Q_{TED} = 2\pi \cdot \frac{W}{\Delta Q}$$

where W is the stored maximum elastic vibration energy per cycle of vibration.

For an MR device that is made from an isotropic material, the computer program code for simulating and determining the temperature variation within the MR device and the thermoelastic damping over one cycle of vibration of the device may use the equation $$\Delta Q = \int_0^{t_0} \int_V \frac{\kappa(\nabla \theta)^2}{T_0} \cdot dv \cdot dt$$

where $t_0$ is the time period of the one cycle of vibration, $\kappa$ is the thermal conductivity, $T_0$ is the absolute initial temperature at a point in the MR device, $\theta$ is the temperature variation, and V is the volume of the MR device. In addition, such program code for determining the quality factor relating to thermoelastic damping may use the equation $$Q_{TED} = 2\pi \cdot \frac{W}{\Delta Q}$$

where W is the stored maximum elastic vibration energy per cycle of vibration.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention will be better understood in relation to the attached drawings illustrating preferred embodiments, wherein:

FIG. 3(a)-(c) illustrate the behavior of theremoelastic damping for a circular thin-plate resonator made of polysilicon.

FIG. 4(a)-(c) illustrate the behavior of theremoelastic damping for a circular thin-plate resonator made of polydiamond.

FIG. 5(a)-(b) shows a comparison between the simulated $Q_{TED}$ using the thermal-energy method and the corresponding $Q_{TED}$ from the theoretical solution to beam resonators.

DETAILED DESCRIPTION OF THE PREFERRED EMBODIMENTS

A. Introduction

As described above, thermo-elastic damping has been identified as the fundamental loss mechanism for micro- and nano-mechanical resonant devices. As noted above, most developers determined Q at the point of experimental measurement. Otherwise, developers were limited to use of a complex-frequency method for attempting to predict thermoelastic damping, and the corresponding numerical models had been implemented in some software tools. However, this method is very hard to employ for resonant devices made out of anisotropic materials due to the complexity of mathematical equations. Further, it is difficult and extremely computationally intensive to implement numerically using FEM software due to the involvement of the complex value of the resonant frequency.

Figure 1:
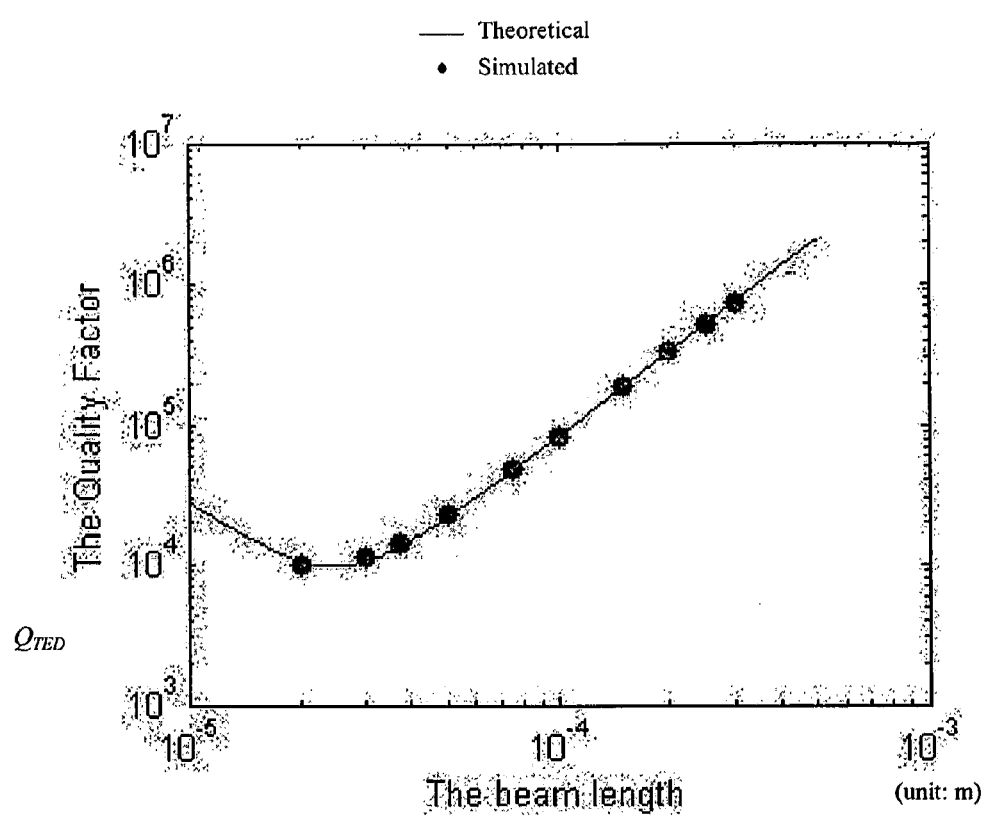
FIG. 1 is a comparison between conventional theoretical solution of the QTED in rectangular beam resonators and the simulated QTED using the thermal-energy approach.

To overcome the aforementioned technical difficulty, a predictive system and method for the design of mechanical resonant devices has been developed for calculating thermoelastic damping, where the thermal energy generated from the mechanical vibrations of a resonant device is directly evaluated. This method has been implemented theoretically and practically in the numerical implementation using software applications or tools (e.g., FEM software). FIG. 1 is a comparison between the conventional theoretical solution of the $Q_{TED}$ in rectangular beam resonators and the simulated $Q_{TED}$ using the thermal-energy approach.

The $Q_{TED}$ of a design may be determined by a computer based tool or system in which the uncoupled elastic vibrations of a micro-/nano-mechanical device are simulated. From such simulation data, optionally stored on a computer readable storage medium, the dilatation ($\nabla \cdot \vec{u}$) and maximum stored elastic vibration energy (W) may be extracted. These extracted data may be used by a computer based tool or system to determine the internal heat source of the device caused by dilatation based on the thermal expansion effect of the material. The internal heat source may then be provided to a computer based tool or system for simulation along with the transient heat conduction, which enables determination of the temperature variation caused by dilatation ($\nabla \cdot \vec{u}$) within the device.

The temperature variation within the device may then be used to determine the thermoelastic damping over one cycle of vibration ($\Delta Q$). The combination of the thermoelastic damping and the maximum stored elastic vibration energy may then be processed to determine $Q_{TED}$.

B. A Theory Based Implementation of the System and Method for an Exemplary Embodiment of a Circular Thin Plate Mechanical Resonance (MR) Device As a preliminary matter, the following table of definitions of nomenclature used in this section may prove useful:

TABLE 1

Nomenclature - Theory Based

| | | | |
|---|---|---|---|
| A | cross-section area of a beam (µm²) | $Y_0$ | uncoupled flexural-mode vibration shape |
| b | beam width (µm) | ν | Poisson's ratio |
| $C_p$ | specific heat (J/kg · K) | ρ | density (kg/m³) |
| E | Young's modulus (GPa) | κ | thermal conductivity (W/m · K) |
| h | beam and thin-plate thickness (µm) | $α_T$ | linear thermal expansion coefficient (l/K) |
| I | moment of inertia (µm⁴) | χ | thermal diffusivity (m²/s) |
| k | frequency parameter of the contour-mode vibrations | $γ_b$ | mode shape factor of a beam resonator |
| | | $γ_p$ | mode shape factor of a circular thin-plate resonator |
| $k_b, ξ_b$ | variables related to thermoelastic damping in a beam resonator | Θ | temperature variation (K) |
| $k_p, ξ_p$ | variables related to thermoelastic damping in a circular thin-plate resonator | $Θ_s$ | general solution to the temperature variation in a circular thin-plate resonator (K) |
| L | beam length (µm) | $Θ_T$ | particular solution to the temperature variation in a circular thin-plate resonator (K) |
| m | contour-mode order | | |
| Q | quality factor | | |
| ΔQ | generation of thermal energy per cycle of vibration (J) | θ | circumferential variable (rad) |
| | | ω | angular resonant frequency (rad/s) |
| r | radial variable (µm) | ΔE | thermal relaxation strength |
| r' | normalized radial variable | $λ_{2D}$ | Lame coefficient in 2D cases (GPa) |
| R | radius of a thin-plate (µm) | $λ_{3D}$ | Lame coefficient in 3D cases (GPa) |
| s | entropy (J/K) | $µ_{2D}$ | Lame coefficient in 2D cases (GPa) |
| $t_0$ | time period of vibration (s) | $µ_{3D}$ | Lame coefficient in 3D cases (GPa) |
| $T_0$ | initial temperature (K) | $β_{T2D}$ | coefficient for thermal expansion in 2D cases (Pa/K) |
| W | maximum stored vibration energy (J) | | |
| ΔW | energy dissipated per cycle of vibration (J) | $β_{T3D}$ | coefficient for thermal expansion in 3D cases (Pa/K) |
| $\vec{u}$ | elastic displacement vector (µm) | Σ | integral constant for the contour-mode |
| $u_r$ | radial displacement (µm) | Π | variable for the temperature variation |
| $u_θ$ | circumferential displacement (µm) | $Π_1$ | integral constant related to the general solution of the temperature variation |
| $∇ · \vec{u}$ | elastic dilatation | | |
| $U_b$ | vibration amplitude of a beam (µm) | $Π_2$ | integral constant related to the particular solution of the temperature variation |
| $U_p/R$ | vibration amplitude of a thin-plate (µm) | | |
| y | y-axis variable | | |
| y' | normalized y-axis variable | | |

This theoretical implementation of the invention (or thermal-energy method) is conducted on resonant devices made out of isotropic materials for exemplary purposes. Here are described:
i) the governing equations associated with thermoelastic damping, ii) the analytical expression for calculating thermoelastic damping, through utilizing the thermal-energy method, and iii) an application example on a circular thin-plate embodiment of a MR device.

i) The governing equations of linear thermoelasticity associated with isotropic solid media that are initially at a uniform temperature $T_0$, are written as:

$$(\lambda + 2 \cdot \mu) \cdot \nabla(\nabla \cdot \vec{\mu}) - \mu \cdot \nabla X \nabla X \vec{\mu} - \beta_T \cdot \nabla \Theta = \rho \cdot \frac{\partial^2 \vec{\mu}}{\partial \tau^2}, \quad (1a)$$

$$\kappa \cdot \nabla^2 \Theta - C_p \cdot \rho \cdot \frac{\partial \Theta}{\partial \tau} = \beta_T \cdot T_0 \cdot \frac{\partial}{\partial \tau}(\nabla \cdot \vec{\mu}), \quad (1b)$$

where κ, ρ, and $C_µ$ are the thermal conductivity, density, and specific heat of the solid medium, respectively. While λ and µ are Lame coefficients, $β_T$ is a coefficient related to thermal expansion effect of the solid medium.

In Eqs. (1), $\vec{u}$ and $Θ=T-T_0$ denote the elastic displacement vector and the temperature variation from the initial temperature $T_0$, respectively. While the last term on the left side of the elastic equation (1a) represents the stress caused by the temperature variation in the solid medium, the term on the right side of the heat conduction equation (1b) represents the temperature variation ($Θ=T-T_0$) resulted from the elastic dilatation ($∇·\vec{u}$), in the solid medium. These two terms are the factors that couple the elastic vibrations and the temperature variation together and cause predicting thermoelastic damping difficult.

ii) In the thermal-energy method, thermoelastic damping is interpreted as the generation of thermal energy per cycle of vibration, which is the very essence of thermoelastic damping. The thermoelastic damping may be calculated by seeking this generation of thermal energy per cycle of vibration—referred to as thermal-energy method, through using entropy—a thermodynamic parameter measuring irreversibility in heat conduction. Then, the analytical expression for thermoelastic damping is expressed as:

$$\Delta Q = -\beta_T \cdot \int_0^{t_0} \int_0^V \Theta \cdot \frac{\partial}{\partial t}(\nabla \cdot \vec{u}) \cdot dv \cdot dt \quad (2)$$

where, $t_0$ is one time period of the vibrations in a resonator.

Both the elastic dilatation and the temperature variation are time-harmonic with the same real resonant frequency, ~eiωt, but the elastic dilatation has a real value and the temperature variation is complex. The integral in Eq. (2) can easily be solved in computational mathematical software.

The real part of the above expression, Re(ΔQ), is equal to the generation of thermal energy per cycle of vibration, or thermoelastic damping, ΔW.

Figure 2:
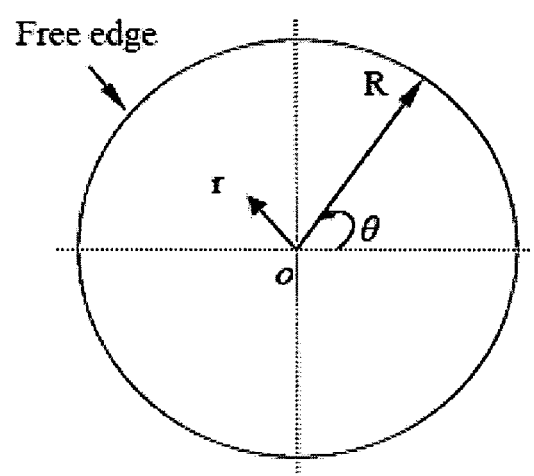
FIG. 2 is a schematic view of a circular thin-plate resonator.

Based on the definition of the mechanical quality factor:

$$Q = 2\pi \cdot \frac{W}{\Delta W}, \quad (3)$$

where $\Delta W$ denotes the energy dissipated per cycle of vibration and $W$ denotes the stored maximum vibration energy in a mechanical resonator, substituting the real part of Eq. (2) into Eq. (3) gives rise to the calculation of $Q_{TED}$, the quality factor related to thermoelastic damping.

iii) The theoretical implementation of the thermal-energy method is demonstrated using an application example on a circular thin-plate embodiment. FIG. 2 illustrates a schematic view of a circular thin-plate resonator with its polar coordinates $(r,\theta)$ originated at the center of the thin-plate. This resonator has a radius of R and a thickness of h, and is initially at a uniform temperature $T_0$.

The elastic dilatation due to the contour-mode vibrations and the temperature variation is written as:

$$\nabla \cdot \vec{u} = -\frac{1-2\upsilon}{1-\upsilon} \cdot k^2 \cdot \frac{U_p}{R^2} \cdot J_m(kr') \cdot \cos(m\theta) \cdot e^{i\omega t} + \frac{2\upsilon}{1-\upsilon} \alpha_T \cdot \Theta \quad (4)$$

The temperature variation in the thin-plate takes the following format:

$$\Theta_0 = -\Pi \cdot \frac{U_p}{R^2} \cdot \frac{k \cdot J_{m-1}(k) - m \cdot J_m(k)}{k_p \cdot J_{m-1}(k_p) - m \cdot J_m(k_p)} \cdot J_m(k_p r')\cos(m\theta) + \quad (5)$$

$$\Pi \cdot \frac{U_p}{R^2} \cdot J_m(kr') \cdot \cos(m\theta).$$

The substitution of the elastic dilatation, Eq. (4), and the temperature variation, Eq. (5), into Eq. (2) leads to the following expression for thermoelastic damping in the mth contour-mode vibrations:

$$\Delta Q = \beta_{T2D} \cdot i\pi^2 \cdot h \cdot \frac{U_p^2}{R^2} \cdot k^2 \cdot \frac{1-2\upsilon}{1-\upsilon} \cdot \quad (6)$$

$$\Pi \cdot \left[ \frac{k \cdot J_{m-1}(k) - m \cdot J_m(k)}{k_p \cdot J_{m-1}(k_p) - m \cdot J_m(k_p)} \cdot \Pi_1 - \Pi_2 \right],$$

where $$\Pi_1 = \int_0^1 J_m(k_p r') \cdot J_m(kr') \cdot r' dr' = \quad (7a)$$

$$\frac{1}{k_p^2 - k^2} \cdot [k \cdot J_{m-1}(k) \cdot J_m(k_p) - k_p \cdot J_{m-1}(k_p) \cdot J_m(k)],$$

and $$\Pi_2 = \int_0^1 J_m(kr')^2 \cdot r' dr' = \frac{1}{2} \cdot [J_m(k)^2 - J_{m-1}(k) \cdot J_{m+1}(k)]. \quad (7b)$$

Then, the calculated thermal energy, Eq. (6), yields the expression for the $Q_{TED}$ of the mth contour-mode vibrations of a circular thin-plate resonator.

$$Q_{TED}^{-1} = \frac{(1-2\upsilon)^2 \cdot (1+\upsilon)}{(1-\upsilon)^3} \cdot \frac{\Delta_E \cdot k^2}{\Sigma} \cdot \text{Re}(\Psi), \quad (8)$$

where $$\Psi = \frac{4\xi_p^4 \cdot i - 2 \cdot \xi_p^2 \cdot k^2}{k^4 + 4\xi_p^4} \cdot \frac{k \cdot J_{m-1}(k) - m \cdot J_m(k)}{k_p \cdot J_{m-1}(k_p) - m \cdot J_m(k_p)} \cdot \Pi_1 - \quad (9)$$

$$\frac{4\xi_p^4 \cdot i - 2 \cdot \xi_p^2 \cdot k^2}{k^4 + 4\xi_p^4} \cdot \Pi_2.$$

FIGS. 3(a)-(c) and 4(a)-(c) illustrate the behavior of thermoelastic damping versus the variable, $\xi p$, thin-plate radius, and resonant frequency of circular thin-plate resonators made from polysilicon and polydiamond, respectively. It becomes clear that both the $Q_{TED}$ value of a thin-plate resonator of the same radius and the minimum $Q_{TED}$ decrease with the increasing contour-mode orders. From these figures, it is further found that the minimum $Q_{TED}$ of the contour-mode vibrations occurs at the resonant frequency as high as a few tens of gigahertz, or alternately at the radius of 40 mm~400 nm. This indicates that thermoelastic damping becomes a significant source of dissipation for circular thin-plate resonators at the nanometer scale. For a circular thin-plate resonator with a resonant frequency below 1 GHz, its $Q_{TED}$ is well above $1\times10^6$. The below table summarizes the minimum values of $Q_{TED}$ and their corresponding frequencies and radii for the contour mode vibrations in a circular thin plate resonator:

TABLE 2

Minimum Values of $Q_{TED}$, corresponding frequencies and radii Contour-Mode Vibrations in Circular Thin-Plate Resonators

| | | Silicon <100> | Silicon <110> | Polysilicon | Polydiamond |
|---|---|---|---|---|---|
| | $\Delta_E$ | $1.616 \times 10^{-4}$ | $2.101 \times 10^{-4}$ | $1.952 \times 10^{-4}$ | $1.729 \times 10^{-4}$ |
| m = 2 | Minimum $Q_{TED}$ | $3.668 \times 10^6$ | $3.880 \times 10^5$ | $1.605 \times 10^6$ | $7.358 \times 10^5$ |
| ($\xi_{pmax}$ = 2.2) | Frequency (GHz) | 35.7 | 55.6 | 45.2 | 18.2 |
| | Radius (nm) | 48 | 39 | 43 | 247 |
| m = 3 | Minimum $Q_{TED}$ | | | $4.240 \times 10^5$ | $1.900 \times 10^5$ |
| ($\xi_{pmax}$ = 3.0) | Frequency (GHz) | | | 57.0 | 22.8 |
| | Radius (nm) | | | 53 | 301 |
| m = 4 | Minimum $Q_{TED}$ | | | $2.574 \times 10^5$ | $1.168 \times 10^5$ |
| ($\xi_{pmax}$ = 3.8) | Frequency (GHz) | | | 60.1 | 23.8 |
| | Radius (nm) | | | 65 | 373 |

C. The General Numerical Implementation of the System and Method

The general numerical implementation of the invention (or thermal-energy method) can be conducted on resonators, which are made out of isotropic materials and/or anisotropic materials and take any structural forms. Here are described i) the governing equations associated with thermoelastic damping for isotropic and anisotropic materials, ii) the analytical expression for calculating thermoelastic damping, through utilizing the thermal-energy method, and iii) several application examples on different structural embodiments.

As a preliminary matter, the following table of definitions of nomenclature used in this section may prove useful:

TABLE 3

Nomenclature - Numerical Implementation

| | |
|---|---|
| b - beam width of a rectangular structural beam | $\dot{s}$ - rate of the entropy density (J · kg$^{-1}$ · K$^{-1}$) |
| $\chi$ - thermal diffusivity of the structural material | $C_P$ - the specific heat of the structural material |
| T - absolute temperature at a point in the resonator | $\dot{\theta}$ - the rate of temperature variation |
| $T_0$ - initial temperature | $\dot{\epsilon}_{ii}$ - the rate of the elastic strain |
| $x_i = (x_1, x_2, x_3)$ - location in a cartesian coordinate system | $c_{ijkl}$ - the fourth-order tensor of the elastic stiffness |
| $u_i = (u_1, u_2, u_3)$ - elastic strain | W - maximum stored elastic vibration energy per cycle of vibration |
| $u_{ij}$ (or $u_{j,i}$) - first order derivative of the ith (or jth) displacement component, with respect to the spatial variable $x_j$ (or $x_i$) | $\beta_{ij} = c_{ijkl} \cdot \alpha_{kl}$ - the thermoelastic coupling tensor |
| | $\alpha_{kl}$ - the thermal expansion tensor |
| $\epsilon_{ij}$ - strain tensor at a point in the resonator | c - elastic stiffness |
| $\theta$ - temperature variation, $\theta = T - T_0$ | [c] - elastic stiffness matrix |
| $\lambda$ and $\mu$ - Lame coefficients | $\{\alpha\}$ - thermal expansion vector |
| $\beta$- coefficient related to thermal expansion effect of the resonator | Q - quality factor |
| | $Q_{TED}$ - the Q related to thermoelastic damping |
| E - Young's modulus | $q_i$ - the ith component of the heat flux vector $\{q\}$ - due to the temperature gradient $\theta_{,i}$ along the $x_i$ variable direction |
| $\nu$ - Poisson's ratio | |
| $\alpha$ - linear thermal expansion coefficient of a structural material | $\kappa$ - thermal conductivity of the structural material |
| $t_0$ - the time period of the one cycle of vibration | t - time |
| $\rho$ - density | $q_i$ - the ith component of the heat flux vector $\{q\}$ due to the temperature gradient $\theta_{,i}$ along the $x_i$ variable direction |
| | V - volume | i) The Governing Equations Associated with Thermoelastic Damping a. Isotropic Materials

The governing equations of linear thermoelasticity for a micromechanical resonator made from an isotropic material are summarized as below:

$$(\lambda + \mu)u_{j,ij} + \mu u_{i,jj} - \beta \theta_{,i} = \rho \ddot{u}_i, \quad (1a)$$

$$\kappa \theta_{,ii} - \rho C_P \dot{\theta} = T_0 \beta \sum_{i=1}^{3} \dot{\epsilon}_{ii}. \quad (1b)$$

b. Anisotropic Materials

The governing equations of linear thermoelasticity for a micromechanical resonator made from an anisotropic material are as follows:

$$\frac{1}{2} c_{ijkl}(u_{k,lj} + u_{l,kj}) - c_{ijkl} \cdot \alpha_{kl} \cdot \theta_{,j} = \rho \ddot{u}_i, \quad (2a)$$

$$k_{ij}\theta_{,ij} - \rho C_P \dot{\theta} = T_0 \beta_{ij} \dot{\epsilon}_{ij}. \quad (2b)$$

c. Single Crystal Silicon

In the MEMS field, orthotropic materials, for instance, single crystal silicon (SCS), have been intensively used as the structural material for micromechanical resonators. Thus, the governing equations of linear thermoelasticity for orthotropic resonators are:

$$\frac{1}{2} c_{ij}(u_{k,lj} + u_{l,kj}) - c_{ij} \cdot \alpha_{kl} \cdot \theta_{,j} = \rho \ddot{u}_i, \quad (3a)$$

$$\kappa \cdot \sum_{i=3}^{3} \theta_{,ii} - \rho C_P \dot{\theta} = T_0(c_{11} + 2c_{12})\alpha \cdot \sum_{i=1}^{3} \dot{\epsilon}_{ii}. \quad (3b)$$

ii) The Analytical Expression for Thermoelastic Damping Using the Thermal Energy Method Thermoelastic damping is interpreted as the generation of thermal energy per cycle of vibration. By using entropy—a thermodynamic parameter measuring irreversibility in heat conduction, the mathematical expression for thermoelastic damping in a micromechanical resonator made from an anisotropic material:

$$\Delta Q = \int_0^{t_0} \int_V [\kappa] \nabla \theta \cdot \frac{\nabla \theta}{T_0} \cdot dv \cdot dt. \quad (4)$$

Consequently, for a micromechanical resonator made from an isotropic material or SCS, the above equation can be simplified as below:

$$\Delta Q = \int_0^{t_0} \int_V \frac{\kappa (\nabla \theta)^2}{T_0} \cdot dv \cdot dt. \quad (5)$$

iii) Numerical Implementation Procedure and its Application on Several Structural Embodiments In order to calculate the mathematical expressions, Eqs. (4) and (5), for thermoelastic damping, one should conduct the numerical implementation, which consists of the following three steps:

a) simulating the uncoupled elastic vibrations in a micromechanical resonator to obtain the elastic strain $\epsilon_{ij}$ and the stored maximum elastic vibration energy, W;

b) converting the elastic strain obtained from the uncoupled elastic simulation into the internal heat source, according to the following expressions:

$$T_0 \cdot \{\beta\}\{\dot{\varepsilon}\}^T \quad \text{(Anisotropic materials)}, \quad (6a)$$

$$T_0 \beta \sum_{i=1}^{3} \dot{\varepsilon}_{ii} \quad \text{(Isotropic materials)}, \quad (6b)$$

$$T_0(c_{11} + 2c_{12})\alpha \cdot \sum_{i=1}^{3} \dot{\varepsilon}_{ii} \quad \text{(orthotropic)}. \quad (6c)$$

c) simulating the transient heat conduction in the resonator with the internal heat source of Eqs. (6) to obtain the temperature variation θ.

Processing the thermal simulation results according to Eq. (4) or (5) gives rise to the calculation of thermoelastic damping, and further leads to the quantitative prediction of the $Q_{TED}$.

The above procedure has been implemented in ANSYS® brand software application sold under the MULTIPHYSICS™ name, using Element Solid45 for isotropic materials and Element Solid64 for anisotropic materials. Certainly, this numerical implementation procedure can be implemented in other FEM (finite element modeling) tools, too. Since processing the simulation results is relatively quick, the running time is approximately the combination of the time for elastic vibrations and that for transient heat conduction, thereby leading to fast speed. Based on this procedure, the $Q_{TED}$ values for micromechanical resonators with different structural geometries have been simulated.

FIG. 5(a)-(b) compares the simulated $Q_{TED}$ using the thermal-energy method and the corresponding $Q_{TED}$ from the theoretical solution to beam resonators with different aspect ratios of beam length to beam width (note that the beam width is fixed at 4 μm). This comparison shows excellent agreement toward the right side of the Debye peak, where maximum thermoelastic damping occurs, and thus demonstrates the validity of this method. The difference between the calculated values and the theoretical values toward the left side of the Debye peak is due to the fact that the theoretical solution is based on the Euler-Bernoulli beam theory and thus, in fact, is not valid toward the left side of Debye peak (a chubby beam), while the thermal-energy method does not have such limitations.

Figure 10A:
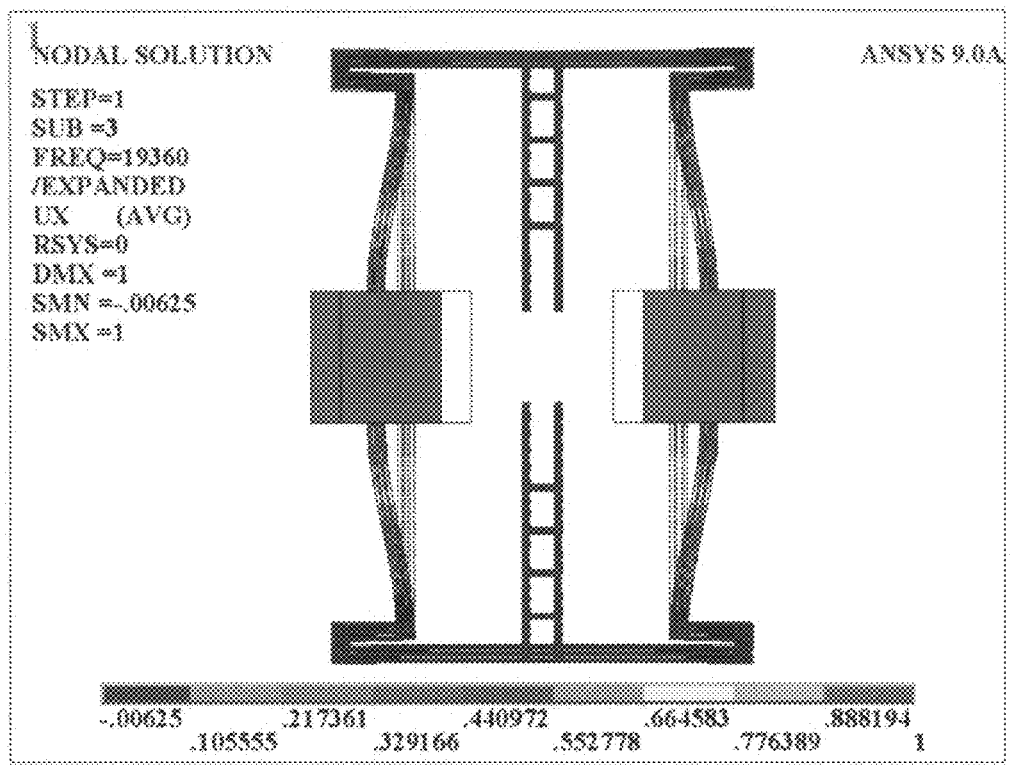
FIG. 10 shows a simulated elastic vibration mode and energy loss distribution due to thermoelastic damping for a single crystal silicon tuning-fork structure with three flexural beams (a) Elastic vibration mode, (b) Energy loss distribution.
Figure 10B:
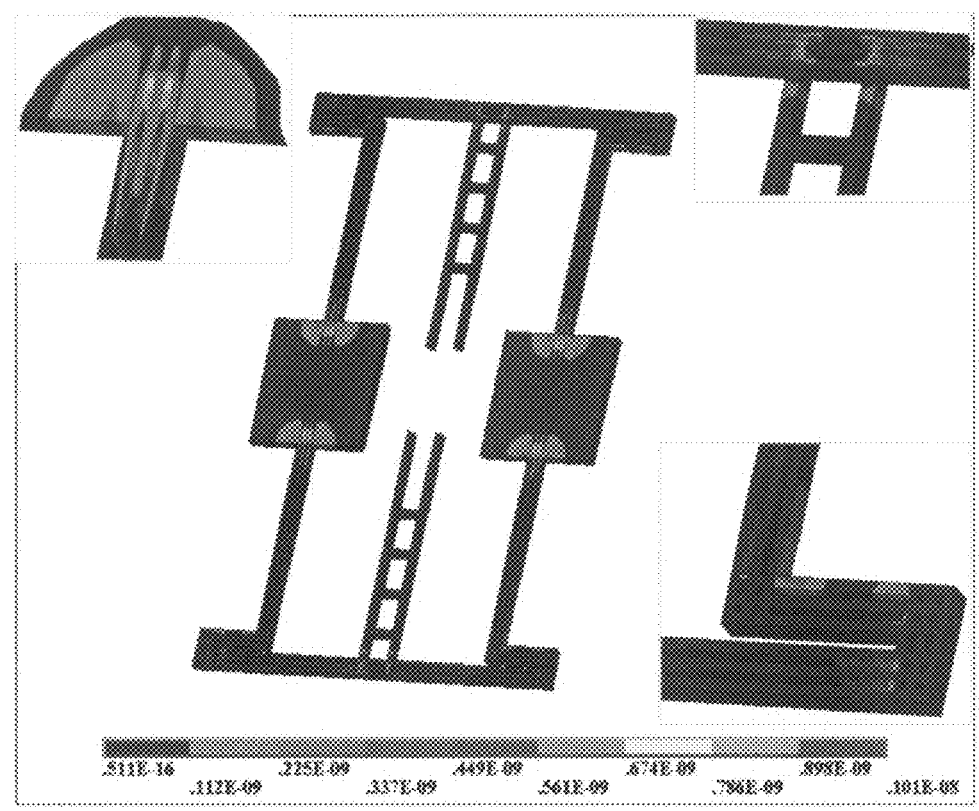
Figure 11A:
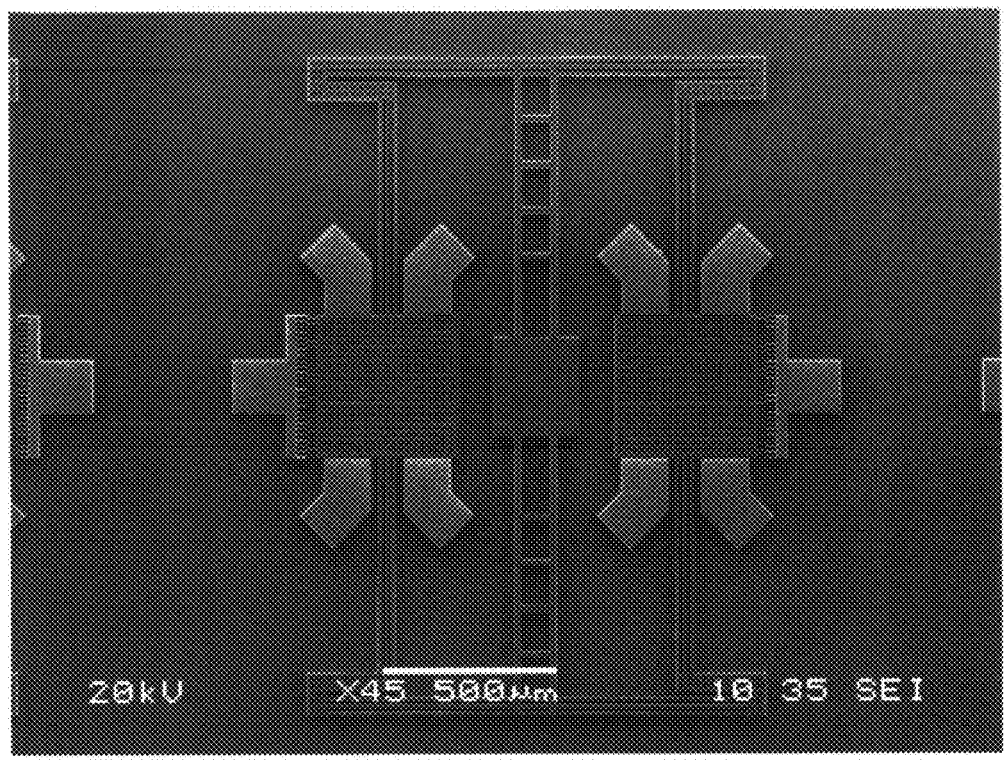
FIG. 11 shows a SEM image and experimental measurement of a tuning fork structure with three vibration beams: (a) SEM image, (b) The measured frequency response showing $Q_{measured}=136,550$ at 19.35 kHz.
Figure 11B:
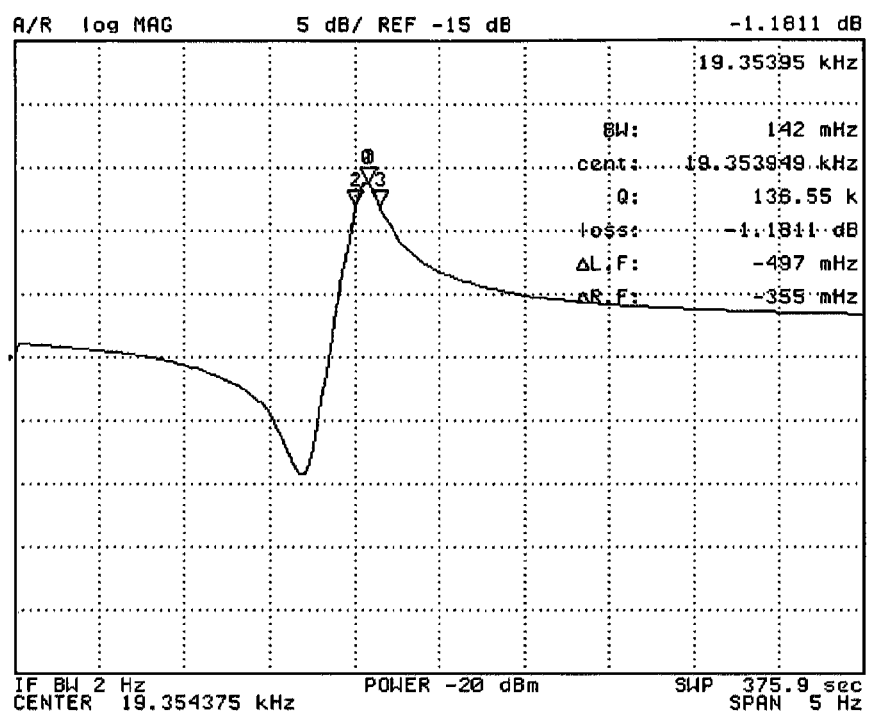

The thermal-energy method may also be applied to other micromechanical resonators with complex geometries. FIGS. 6-9 illustrate the simulated elastic vibration modes and energy loss distribution (the integrand in equation (4) or (5)) due to thermoelastic damping in a tuning-fork structure, a block resonator, and a disk resonator, respectively. The structural geometrical parameters are taken from the literature. FIG. 10 illustrates the simulated elastic vibration mode and energy loss distribution due to thermoelastic damping in a tuning-fork structure with three flexural beams, which is designed for improving the $Q_{TED}$ in the tuning-fork structure shown in FIG. 6. Its SEM (Scanning Electron Microscope) image and measured frequency response from a network analyzer are illustrated in FIG. 11.

The table below compares the simulated $Q_{TED}$ and the measured quality factor for those micromechanical resonators illustrated in FIGS. 6-11, showing good agreement in the sense that the simulated $Q_{TED}$ values are larger than the corresponding measured Q values, which consist of other loss mechanisms, such as support loss and surface loss:

TABLE 4

Comparison between the simulated $Q_{TED}$ using the thermal-energy method and the measured Q of micromechanical resonators with different geometries

| Materials | Calculated $Q_{TED}$ | Measured Q |
|---|---|---|
| Tuning-fork (Drive-mode) | 87,635 | 81,000 |
| Tuning-fork (Sense-mode) | 83,563 | 64,000 |
| Tuning-fork with three flexural beams | 186,073 | 136,550 |
| Block resonator | 1,551,876 | 180,000 |
| Disk resonator | 7,153,088 | 39,300 |
| Flexural vibration resonator | 10,439 | 10,281 |

Figure 6A:
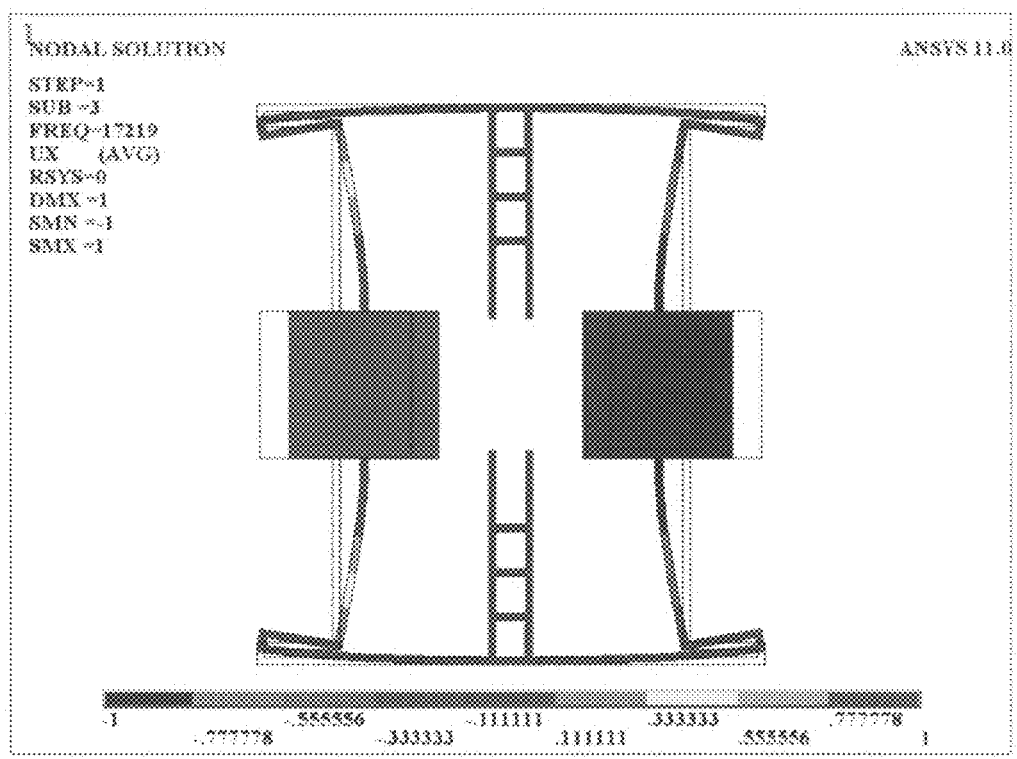
FIG. 6(a)-(b) shows a simulated elastic vibration mode and energy loss distribution due to thermoelastic damping for the drive-mode of a tuning fork gyroscope made from single crystal silicon: (a) Elastic vibration mode, (b) Energy loss distribution.
Figure 6B:
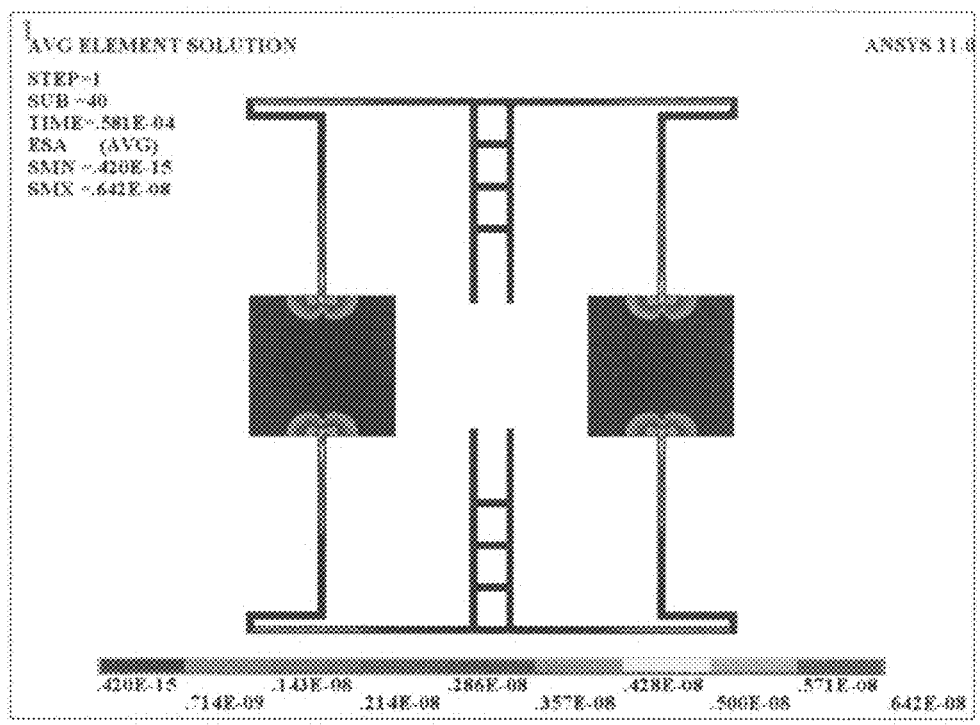
Figure 7A:
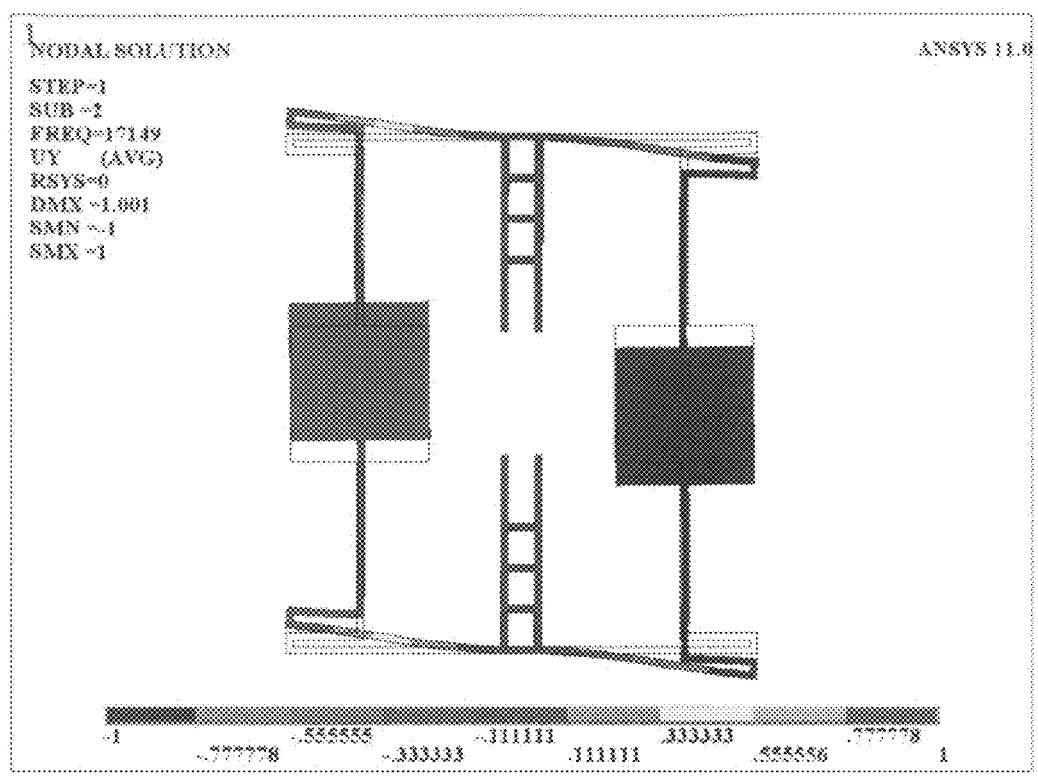
FIG. 7(a)-(b) shows a simulated elastic vibration mode and energy loss distribution due to thermoelastic damping for the sense-mode of a tuning fork gyroscope made from single crystal silicon: (a) Elastic vibration mode, (b) Energy loss distribution.
Figure 7B:
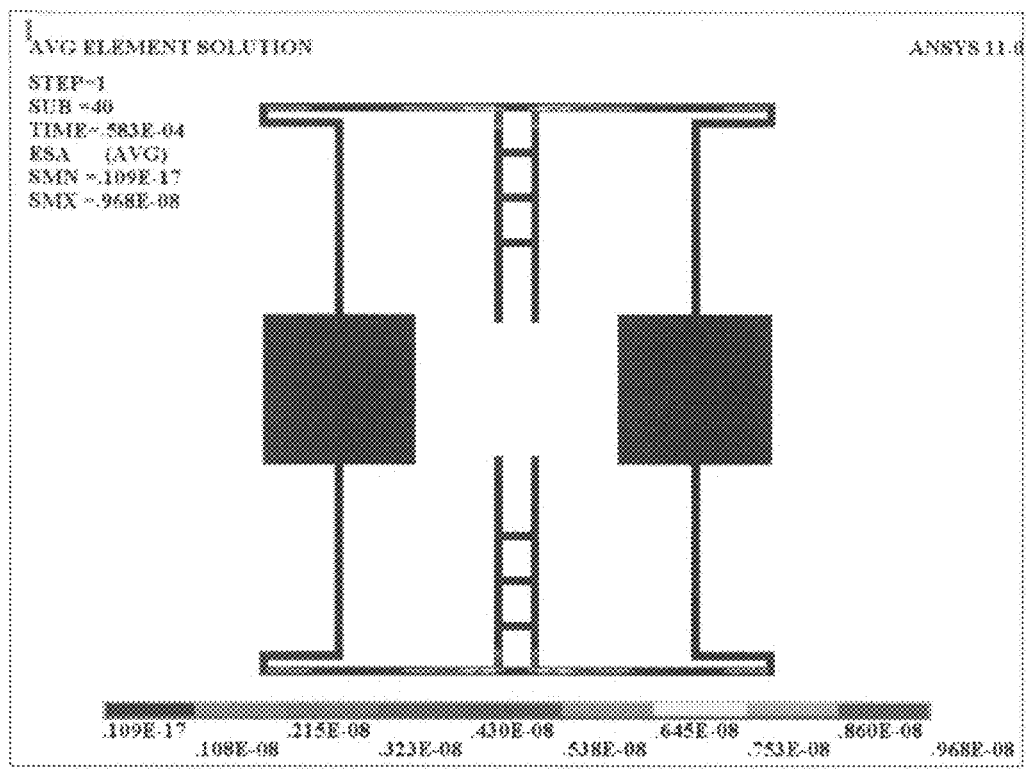
Figure 8A:
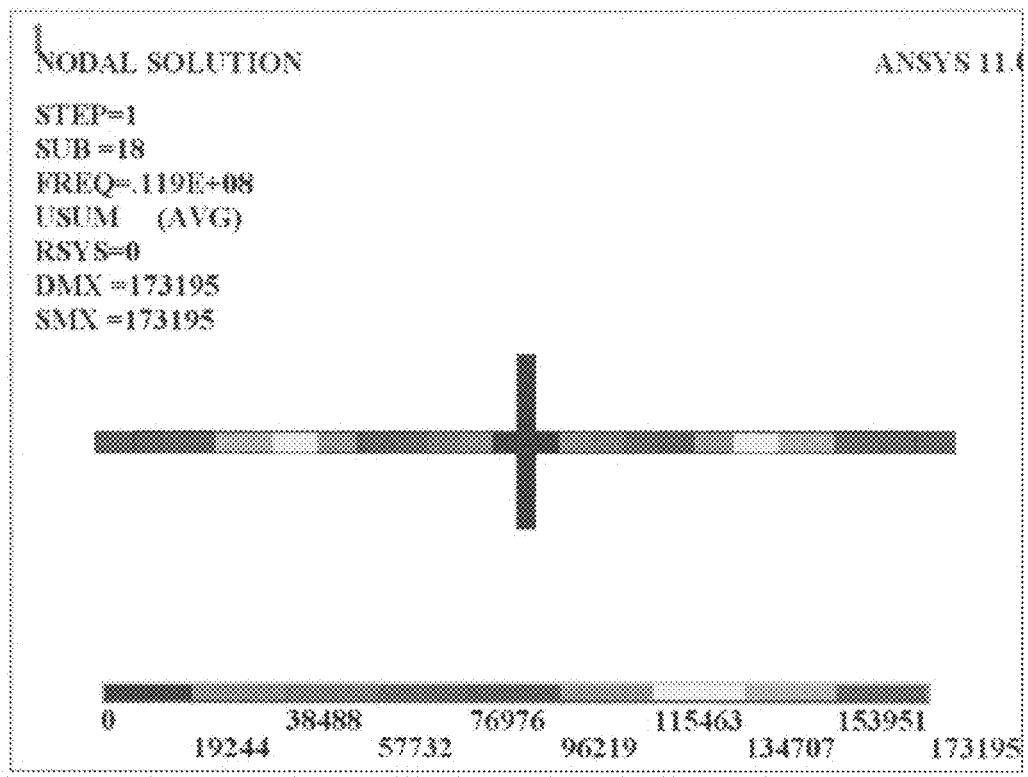
FIG. 8 shows a simulated elastic vibration mode and energy loss distribution due to thermoelastic damping for a block resonator made from single crystal silicon: (a) Elastic vibration mode, (b) Energy loss distribution.
Figure 8B:
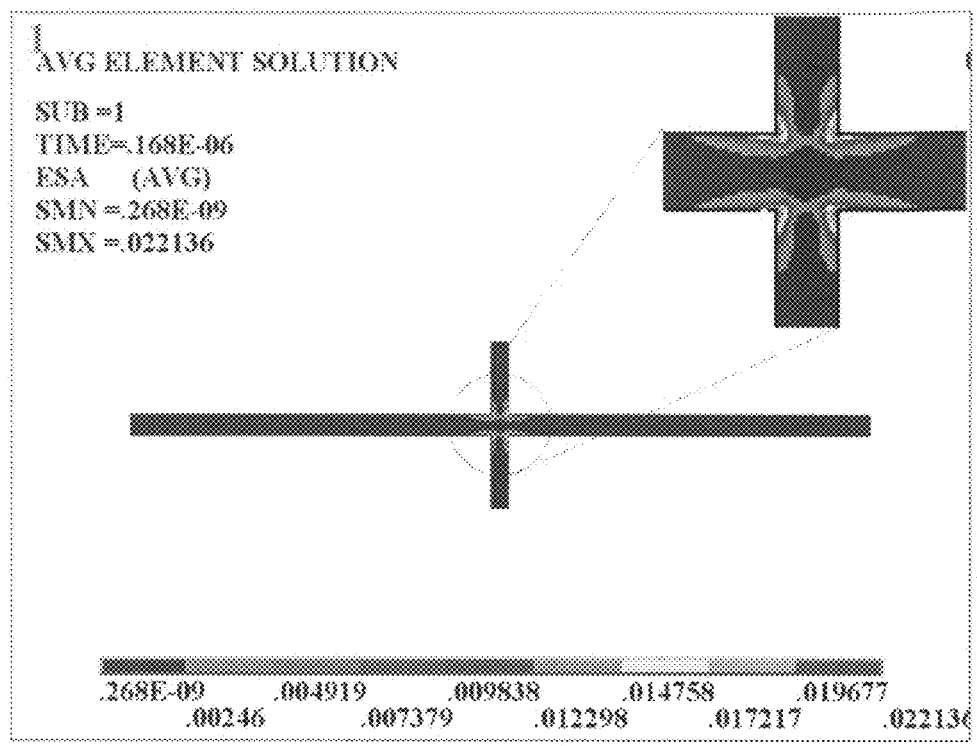
Figure 9A:
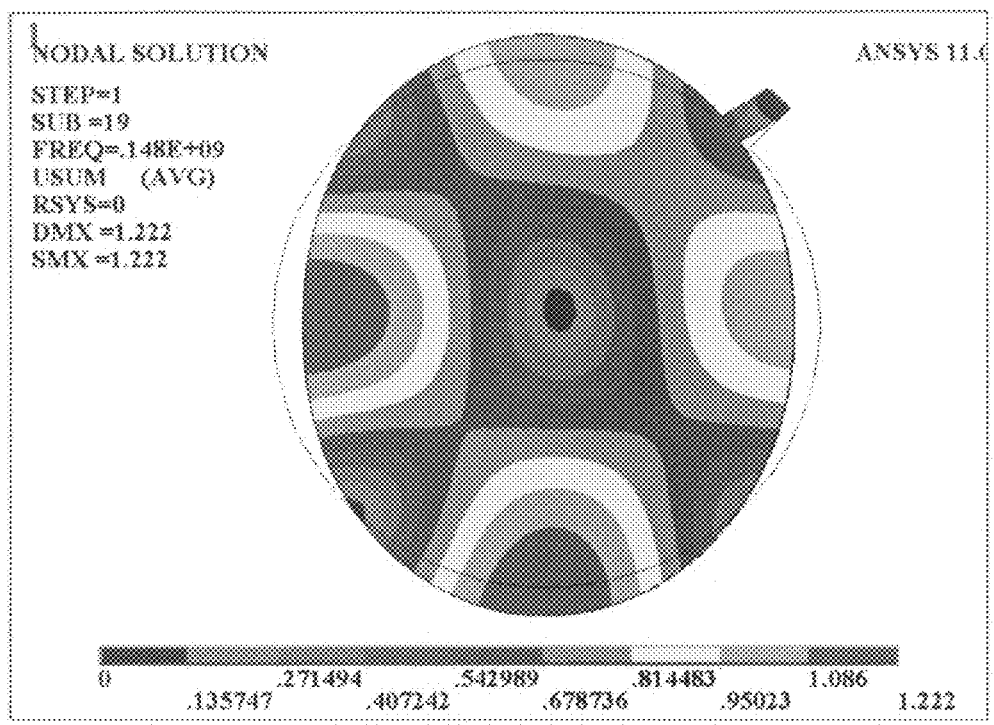
FIG. 9 shows a simulated elastic vibration mode and energy loss distribution due to thermoelastic damping for a disk resonator with a side-support beam and made from single crystal silicon: (a) Elastic vibration mode, (b) Energy loss distribution.
Figure 9B:
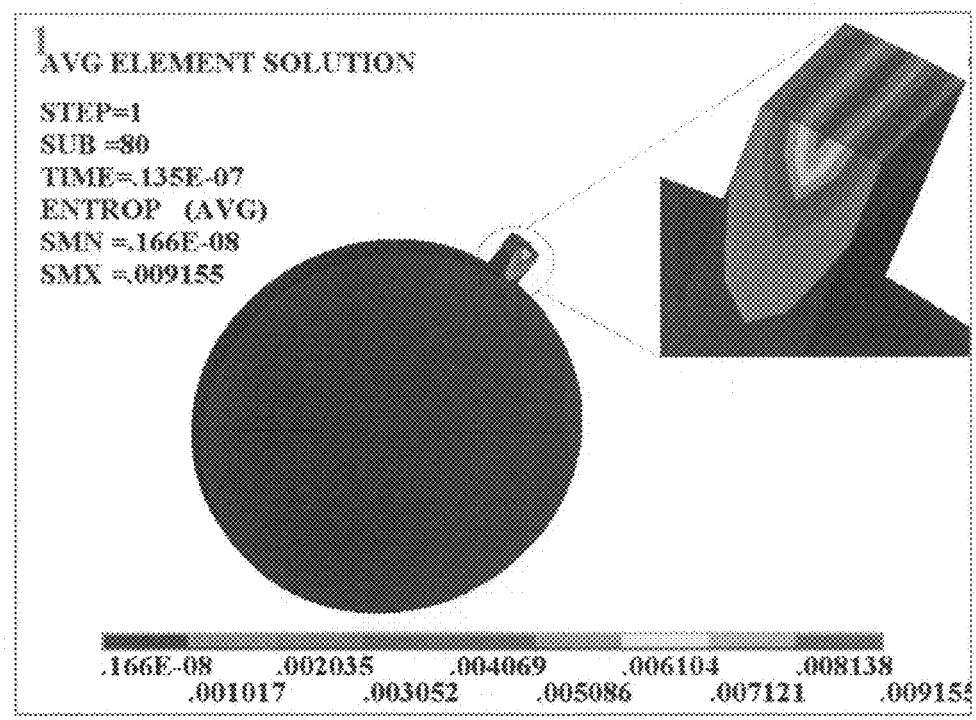

In particular, it is found from this comparison that thermoelastic damping is the dominant loss for the two tuning fork structures shown in FIGS. 6, 7, and 10, while it is not a concern for the disk resonator and the block resonator. It is worth mentioning that this numerical implementation is also applicable to a micromechanical resonator made from different structural materials, as far as the appropriate equations are identified for these materials. Moreover, this thermal-energy method is capable of predicting energy loss distribution due to thermoelastic damping. This feature will facilitate the design optimization of a micromechanical resonator for a higher $Q_{TED}$.

D. Summary

Accordingly, an aspect of the present invention is a system for the design of a mechanical resonant (MR) device. This system is adaptable for use with a processor coupled to a computer storage media capable of being read by the computer processor, the processor also being coupled to an input device for a user, with implementation using an application program. This application program is for simulating uncoupled elastic vibration of the MR device design to produce simulated dilatation of the MR device. The application collects data input by a user relating to dilatation and maximum stored elastic vibration energy of the MR device design. The application determines the internal heat source data of the MR device caused by dilatation based on the thermal expansion effect of the MR device material, wherein said internal heat source data is capable of being submitted, along with transient heat conduction data input by a user, to an engine of the application that is adapted to simulate and determine the temperature variation within the MR device and the thermoelastic damping over one cycle of vibration of the device. With this, the application is capable of determining the quality factor relating to thermoelastic damping as a function of the thermoelastic damping over one cycle of vibration of the device and the maximum elastic vibration energy stored over one cycle of vibration.

If the MR device is made from an anisotropic material, an embodiment of the application program may simulate and determine the temperature variation within the MR device and the thermoelastic damping over one cycle of vibration of the device using the equation $$\Delta Q = \int_0^{t_0} \int_V [\kappa] \nabla \theta \cdot \frac{\nabla \theta}{T_0} \cdot dv \cdot dt$$

where $t_0$ is the time period of the one cycle of vibration, $\kappa$ is the thermal conductivity, $T_0$ is the absolute initial temperature at a point in the MR device, $\theta$ is the temperature variation, and V is the volume of the MR device. Another embodiment of that application program may determine the quality factor relating to thermoelastic damping using the equation $$Q_{TED} = 2\pi \cdot \frac{W}{\Delta Q}$$

where W is the stored maximum elastic vibration energy per cycle of vibration.

If the MR device is made from an isotropic material, an embodiment of the application program may simulate and determine the temperature variation within the MR device and the thermoelastic damping over one cycle of vibration of the device using the equation $$\Delta Q = \int_0^{t_0} \int_V \frac{\kappa (\nabla \theta)^2}{T_0} \cdot dv \cdot dt$$

where $t_0$ is the time period of the one cycle of vibration, $\kappa$ is the thermal conductivity, $T_0$ is the absolute initial temperature at a point in the MR device, $\theta$ is the temperature variation, and V is the volume of the MR device. Another embodiment of that application program may determine the quality factor relating to thermoelastic damping using the equation $$Q_{TED} = 2\pi \cdot \frac{W}{\Delta Q}$$

where W is the stored maximum elastic vibration energy per cycle of vibration.

Figure 12:
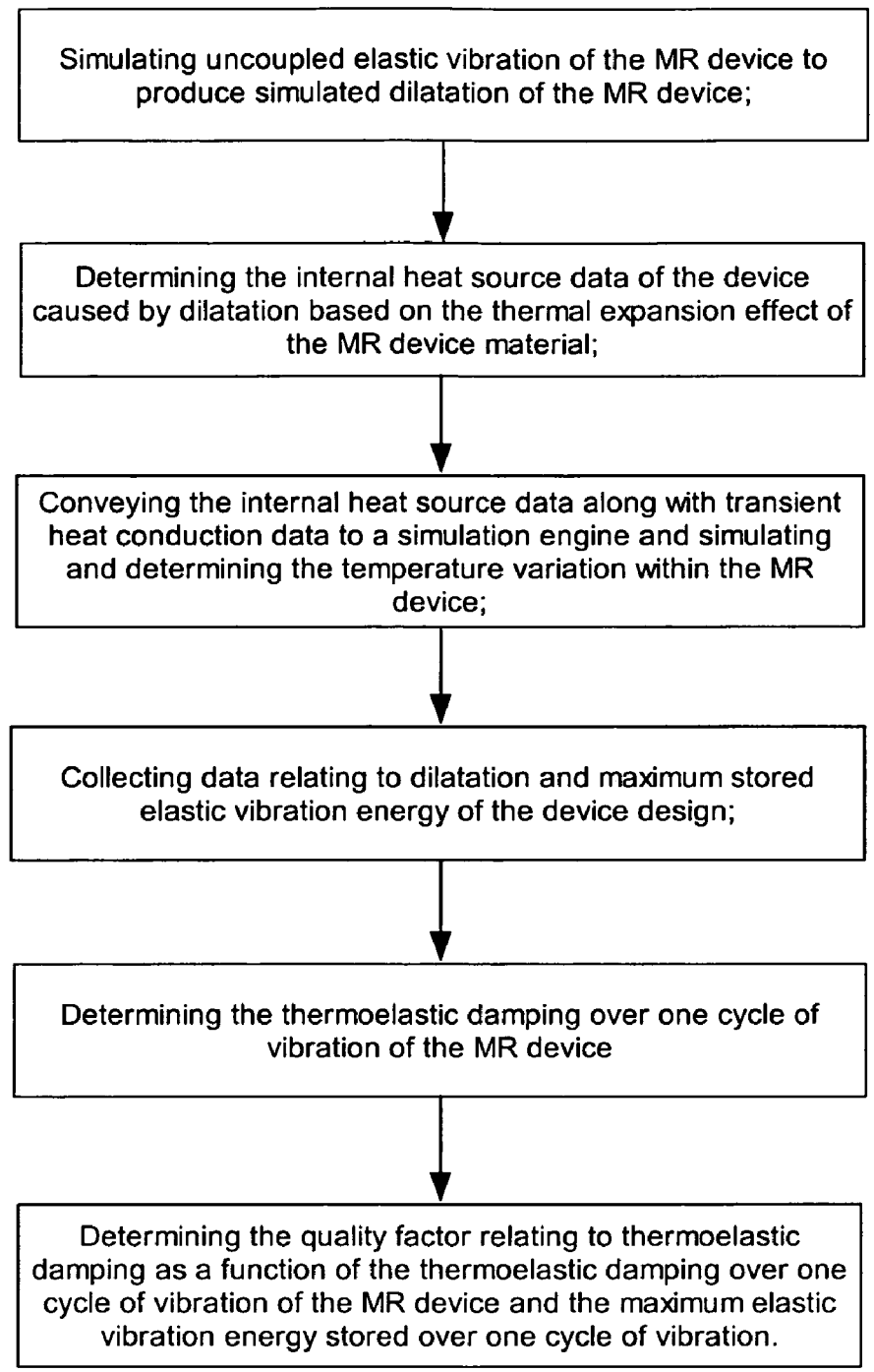
FIG. 12 is a flowchart of the method of the present invention.

An aspect of the present invention is a method of predicting the quality factor of a design of a mechanical resonance (MR) device, as shown if FIG. 12. This method involves simulating uncoupled elastic vibration of the MR device to produce simulated dilatation of the MR device; collecting data relating to dilatation and maximum stored elastic vibration energy of the device design; determining the internal heat source data of the device caused by dilatation based on the thermal expansion effect of the MR device material; conveying the internal heat source data along with transient heat conduction data to a simulation engine and simulating and determining the temperature variation within the MR device; determining the thermoelastic damping over one cycle of vibration of the MR device; and determining the quality factor relating to thermoelastic damping as a function of the thermoelastic damping over one cycle of vibration of the MR device and the maximum elastic vibration energy stored over one cycle of vibration.

In the event that the method is applied to an MR device made from an anisotropic material, then the step of simulating and determining the temperature variation within the MR device and the thermoelastic damping over one cycle of vibration of the device may use the equation $$\Delta Q = \int_0^{t_0} \int_V [\kappa] \nabla \theta \cdot \frac{\nabla \theta}{T_0} \cdot dv \cdot dt$$

where $t_0$ is the time period of the one cycle of vibration, $\kappa$ is the thermal conductivity, $T_0$ is the absolute initial temperature at a point in the MR device, $\theta$ is the temperature variation, and V is the volume of the MR device. Such a method may involve a step for determining the quality factor relating to thermoelastic damping using the equation $$Q_{TED} = 2\pi \cdot \frac{W}{\Delta Q}$$

where W is the stored maximum elastic vibration energy per cycle of vibration.

In the event that the method is applied to an MR device made from an isotropic material, then the step of simulating and determining the temperature variation within the MR device and the thermoelastic damping over one cycle of vibration of the device may use the equation $$\Delta Q = \int_0^{t_0} \int_V \frac{\kappa (\nabla \theta)^2}{T_0} \cdot dv \cdot dt$$

where $t_0$ is the time period of the one cycle of vibration, $\kappa$ is the thermal conductivity, $T_0$ is the absolute initial temperature at a point in the MR device, $\theta$ is the temperature variation, and V is the volume of the MR device. Such a method may involve a step for determining the quality factor relating to thermoelastic damping using the equation $$Q_{TED} = 2\pi \cdot \frac{W}{\Delta Q}$$

where W is the stored maximum elastic vibration energy per cycle of vibration.

The present invention may be implemented on a computer readable medium. That is, an aspect of the present invention is a computer readable medium storing a computer program product for predicting the quality factor of a design of a mechanical resonance (MR) device, the computer readable medium having computer program code for simulating uncoupled elastic vibration of the MR device to produce simulated dilatation of the MR device, computer program code for collecting data relating to dilatation and maximum stored elastic vibration energy of the device design, computer program code for determining the internal heat source data of the device caused by dilatation based on the thermal expansion effect of the MR device material; computer program code for conveying the internal heat source data along with transient heat conduction data to a simulation engine and simulating and determining the temperature variation within the MR device; computer program code for determining the thermoelastic damping over one cycle of vibration of the MR device; and computer program code for determining the quality factor relating to thermoelastic damping as a function of the thermoelastic damping over one cycle of vibration of the MR device and the maximum elastic vibration energy stored over one cycle of vibration.

For an MR device that is made from an anisotropic material, the computer program code for simulating and determining the temperature variation within the MR device and the thermoelastic damping over one cycle of vibration of the device may use the equation $$\Delta Q = \int_0^{t_0} \int_V [\kappa] \nabla \theta \cdot \frac{\nabla \theta}{T_0} \cdot dv \cdot dt$$

where $t_0$ is the time period of the one cycle of vibration, $\kappa$ is the thermal conductivity, T is the absolute initial temperature at a point in the MR device, $\theta$ is the temperature variation, and V is the volume of the MR device. In addition, such program code for determining the quality factor relating to thermoelastic damping may use the equation $$Q_{TED} = 2\pi \cdot \frac{W}{\Delta Q}$$

where W is the stored maximum elastic vibration energy per cycle of vibration.

For an MR device that is made from an isotropic material, the computer program code for simulating and determining the temperature variation within the MR device and the thermoelastic damping over one cycle of vibration of the device may use the equation $$\Delta Q = \int_0^{t_0} \int_V \frac{\kappa (\nabla \theta)^2}{T_0} \cdot dv \cdot dt$$

where $t_0$ is the time period of the one cycle of vibration, $\kappa$ is the thermal conductivity, $T_0$ is the absolute initial temperature at a point in the MR device, $\theta$ is the temperature variation, and V is the volume of the MR device. In addition, such program code for determining the quality factor relating to thermoelastic damping may use the equation $$Q_{TED} = 2\pi \cdot \frac{W}{\Delta Q}$$

where W is the stored maximum elastic vibration energy per cycle of vibration.

Some advantages of the present invention include the general applicability to both isotropic and anisotropic materials, general applicability to both regular and irregular geometrical structures/devices, and an implementation that is easy-to-use, fast, accurate, with no problems of divergence, and straightforward. The present invention may have a variety of applications, such as the prediction of thermoelastic damping in any micro- and nano-mechanical resonators in the design phase before manufacturing or improvement of the resonator design.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any prompts associated with the present invention may be presented and responded to via a graphical user interface (GUI) presented on the display of the mobile communications device or the like. Prompts may also be audible, vibrating, etc.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system for the design of a mechanical resonant (MR) device, comprising:
a processor;
a storage media coupled with the processor;
an input device coupled with the processor;
an application program executed by the processor for simulating uncoupled elastic vibration of the MR device design to produce simulated dilatation of the MR device, wherein said application program collects data input by a user relating to dilatation and maximum stored elastic vibration energy of the MR device design; determines internal heat source data of the MR device caused by dilatation based on the thermal expansion effect of the MR device material, wherein said internal heat source data is submitted, along with transient heat conduction data input by a user, to an engine to simulate and determine the temperature variation within the MR device and the thermoelastic damping over one cycle of vibration of the MR device;
wherein the application program determines a quality factor relating to thermoelastic damping as a function of the thermoelastic damping over one cycle of vibration of the MR device and the maximum elastic vibration energy stored over one cycle of vibration; and
wherein the MR device is made from an anisotropic material and the application program simulates and determines the temperature variation within the MR device and the thermoelastic damping over one cycle of vibration of the device using the equation $$\Delta Q = \int_0^{t_0} \int_V [\kappa] \nabla \theta \cdot \frac{\nabla \theta}{T_0} \cdot dv \cdot dt$$

where $t_0$ is a time period of the one cycle of vibration, $\kappa$ is thermal conductivity, $T_0$ is an absolute initial temperature at a point in the MR device, $\theta$ is temperature variation, and V is volume of the MR device.

2. The system of claim 1, wherein the application program determines the quality factor relating to thermoelastic damping using the equation $$Q_{TED} = 2\pi \cdot \frac{W}{\Delta Q}$$

where W is stored maximum elastic vibration energy per cycle of vibration.

3. A system for the design of a mechanical resonant (MR) device, comprising:
a processor;
a storage media coupled with the processor;
an input device coupled with the processor;
an application program executed by the processor for simulating uncoupled elastic vibration of the MR device design to produce simulated dilatation of the MR device, wherein said application program collects data input by a user relating to dilatation and maximum stored elastic vibration energy of the MR device design; determines internal heat source data of the MR device caused by dilatation based on a thermal expansion effect of the MR device material, wherein said internal heat source data is submitted, along with transient heat conduction data input by a user, to an engine to simulate and determine temperature variation within the MR device and thermoelastic damping over one cycle of vibration of the MR device;
wherein the application program determines a quality factor relating to thermoelastic damping as a function of the thermoelastic damping over one cycle of vibration of the MR device and the maximum elastic vibration energy stored over one cycle of vibration; and
wherein the MR device is made from an isotropic material and the application program simulates and determines the temperature variation within the MR device and the thermoelastic damping over one cycle of vibration of the device using the equation $$\Delta Q = \int_0^{t_0} \int_V \frac{\kappa(\nabla\theta)^2}{T_0} \cdot dv \cdot dt$$

where $t_0$ is a time period of the one cycle of vibration, $\kappa$ is thermal conductivity, $T_0$ is an absolute initial temperature at a point in the MR device, $\theta$ is temperature variation, and V is volume of the MR device.

4. The system of claim 3, wherein the application program determines the quality factor relating to thermoelastic damping using the equation $$Q_{TED} = 2\pi \cdot \frac{W}{\Delta Q}$$

where W is stored maximum elastic vibration energy per cycle of vibration.

5. A method of predicting the quality factor of a design of a mechanical resonance (MR) device comprising:
   simulating uncoupled elastic vibration of the MR device to produce simulated dilatation of the MR device using a computer processor;
   collecting data relating to dilatation and maximum stored elastic vibration energy of the MR device design;
   determining internal heat source data of the MR device caused by dilatation based on thermal expansion effect of the MR device material;
   conveying the internal heat source data along with transient heat conduction data to a simulation engine and simulating and determining temperature variation within the MR device;
   determining thermoelastic damping over one cycle of vibration of the MR device;
   determining the quality factor relating to the thermoelastic damping as a function of the thermoelastic damping over one cycle of vibration of the MR device and the maximum elastic vibration energy stored over one cycle of vibration; and
   wherein the MR device is made from an anisotropic material and the step of simulating and determining the temperature variation within the MR device and the thermoelastic damping over one cycle of vibration of the device uses the equation $$\Delta Q = \int_0^{t_0} \int_V [\kappa]\nabla\theta \cdot \frac{\nabla\theta}{T_0} \cdot dv \cdot dt$$

where $t_0$ is the time period of the one cycle of vibration, $\kappa$ is thermal conductivity, $T_0$ is an absolute initial temperature at a point in the MR device, $\theta$ is the temperature variation, and V is volume of the MR device.

6. The method of claim 5, wherein the step of determining the quality factor relating to thermoelastic damping uses the equation $$Q_{TED} = 2\pi \cdot \frac{W}{\Delta Q}$$

where W is stored maximum elastic vibration energy per cycle of vibration.

7. A method of predicting the quality factor of a design of a mechanical resonance (MR) device comprising:
   simulating uncoupled elastic vibration of the MR device to produce simulated dilatation of the MR device using a computer processor;
   collecting data relating to dilatation and maximum stored elastic vibration energy of the MR device design;
   determining internal heat source data of the MR device caused by dilatation based on thermal expansion effect of the MR device material;
   conveying the internal heat source data along with transient heat conduction data to a simulation engine and simulating and determining temperature variation within the MR device;
   determining thermoelastic damping over one cycle of vibration of the MR device;
   determining the quality factor relating to the thermoelastic damping as a function of the thermoelastic damping over one cycle of vibration of the MR device and the maximum elastic vibration energy stored over one cycle of vibration; and
   wherein the MR device is made from an isotropic material and the step of simulating and determining the temperature variation within the MR device and the thermoelastic damping over one cycle of vibration of the device uses the equation $$\Delta Q = \int_0^{t_0} \int_V \frac{\kappa(\nabla\theta)^2}{T_0} \cdot dv \cdot dt$$

where $t_0$ is a time period of the one cycle of vibration, $\kappa$ is thermal conductivity, $T_0$ is an absolute initial temperature at a point in the MR device, $\theta$ is temperature variation, and V is volume of the MR device.

8. The method of claim 7, wherein the step of determining the quality factor relating to thermoelastic damping uses the equation $$Q_{TED} = 2\pi \cdot \frac{W}{\Delta Q}$$

where W is stored maximum elastic vibration energy per cycle of vibration.

* * * * *